May 2, 1933. W. B. CLIFFORD 1,906,313
PACKLESS VALVE
Filed Jan. 18, 1929

Witness
Helmar Van Dine

Inventor
Walter B. Clifford
by his attorneys
Van Everen Fish Hildreth Cary

Patented May 2, 1933

1,906,313

UNITED STATES PATENT OFFICE

WALTER B. CLIFFORD, OF BOSTON, MASSACHUSETTS, ASSIGNOR TO CLIFFORD MANUFACTURING CO., OF BOSTON, MASSACHUSETTS, A CORPORATION OF DELAWARE

PACKLESS VALVE

Application filed January 18, 1929. Serial No. 333,437.

The present invention relates to valves, more particularly adapted for use with vacuum or relatively high pressures.

The purpose of the invention is to provide a valve of the so-called packless type which is relatively small and compact and is hermetically sealed against leakage through the stem.

It has been customary heretofore to provide valves of this general type in which the stem is sealed with a metallic bellows or multiple diaphragm, the corrugated wall of the bellows expanding or contracting with movements of the valve stem, and serving to seal the space about the valve stem and prevent leakage therethrough. Apparatus of this type, however, as heretofore constructed has at least two inherent disadvantages: first, it has comparative complication with attendant expense of construction, and second, the liability of imposing a torsional strain upon the bellows or multiple diaphragm transmitted from the operating stem, such a strain materially shortening the life of the bellows element, if not immediately destructive thereof.

According to the present invention, a relatively small and compact valve, capable of withstanding high pressures, is produced. In addition, the bellows or sealing element is entirely free from torsional strains due to rotation of the operating stem. The valve stem is guided adjacent the valve end in a manner to avoid restriction in the passage. Furthermore, the construction is designed in such a manner that assembly of the operating parts is facilitated, and a relatively strong and easily operated unit is obtained.

Figure 1:
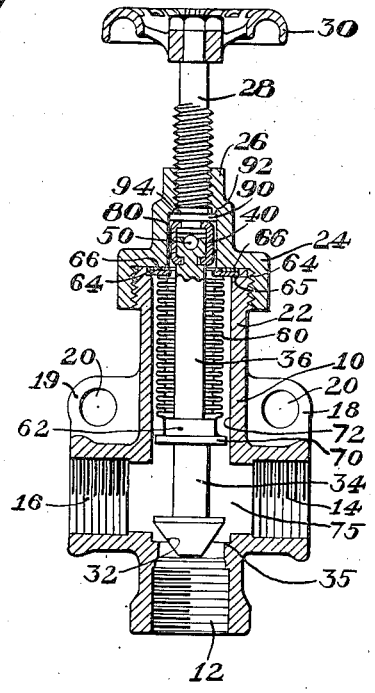
Figure 3:
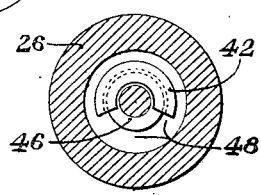
Figure 2:
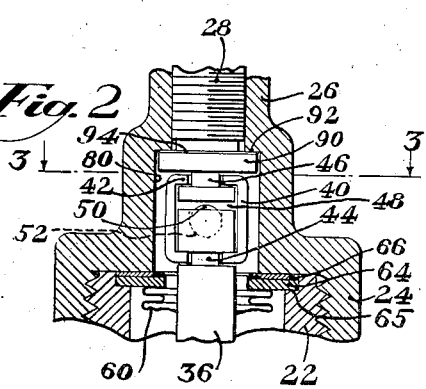

Referring to the accompanying drawing, Fig. 1 represents a section in elevation of the improved valve;

Fig. 2 is a detail illustrating on an enlarged scale the connection between the operating stem and valve stem proper; and Fig. 3 is a detail illustrating a section on the line 3—3 of Fig. 2, showing primarily a top plan view of the collar connecting the operating valve stem.

A specific form of valve shown in the present invention is particularly adapted as a shut-off valve for multiple refrigerator installations where it is desired to cut off one or more units from the main operating source, as in apartment house installations. To this end the body portion 10 conveniently consists of a brass forging having a port 12 at the bottom of the valve and aligned therewith, and oppositely disposed ports 14 and 16 at right angles thereto. The valve body is provided with attaching lugs 18 and 19, each having a bolt-receiving opening 20 for attachment to a mounting board or similar device. The upper portion of the body is provided with an elongated neck portion 22 of comparatively small diameter which receives the valve stem and surrounding bellows. The neck portion is threaded at its upper end to receive a bonnet 24 with a reduced upper end 26 threaded internally to receive a through operating stem 28 having a hand wheel 30 mounted at its upper end. A conical valve 32 is formed integrally on the lower end of a valve stem 34, the valve cooperating with a sharp-edged seat 35 formed at the mouth or entrance of the port 12. The upper portion of the valve stem 34 is reduced in diameter, as indicated at 36, and terminates within the bonnet 24, as shown in Fig. 1. The adjacent ends of the valve stem 36 and operating stem 28 are detachably connected by a ring or collar 40 having inturned flanges 42 at opposite ends which engage within annular recesses or channels formed respectively at 44 and 46 on the valve stem and operating stem. The collar is open at 48 to permit insertion and removal of the stems, as shown in Figs. 2 and 3. The opposing ends of the stems are maintained in frictionless engagement during the downward or closing movement of the valve by an anti-friction ball 50 located in a cup-shaped recess 52 formed in the upper end of the valve stem, as indicated. This ball may conveniently be made of steel or bronze, as desired. It will be evident that during the closing movements of the valve, movement is transmitted from the operating stem 28 to the valve stem 36 through engagement of the ends through the anti-friction ball 50. With this construction there is no tendency, due to the rotation of the operating stem, to transmit a corresponding rotation to the valve stem. Upon the reverse or opening movement, the valve stem is caused to move with the operating stem, due to the connecting collar 40, and here again there is no injurious torsional strain imposed due to the freedom from substantial pressure-resisting movement in this direction.

The space about the valve stem is sealed hermetically from the interior of the valve body by a metallic bellows, indicated at 60, which surrounds the portion 36 of the valve stem within the reduced neck 22 of the valve body. At its lower end the bellows is spun out over an enlarged portion 62 and is soldered thereto, as indicated in Fig. 1. At its upper end the bellows is spun out slightly over the edge of a supporting plate or disk 64 which is located within a recess 65 formed in the upper end of the neck 10. The entire space above the plate is then flooded with solder, indicated generally at 66, to hermetically seal the plate within the body and the upper end of the bellows to the plate. Located below the enlargement 62 and formed integrally with the valve stem is a circular boss or guide 70 which slides freely within the portion 72 of the body and forms a guide to prevent substantial displacement of the valve and stem with relation to the cooperating seat. It will be evident from an inspection of Fig. 1, that during the movements of the valve from open to closed position, and vice versa, the guide 70 is maintained entirely within the chamber 72 and wholly above the operating chamber 75, and a portion of the valve stem 34 intersecting the operating chamber is comparatively small and restricted in diameter, offering a minimum of obstruction to the through passage of fluid therethrough. When it is understood that the metallic bellows actually employed in the illustrated embodiment of the invention has a diameter approximating one-half inch, it will be evident that a valve stem of relatively small diameter is employed in a manner offering a minimum of obstruction.

In assembling the construction shown, the valve stem may be first connected with the bellows seal at its lower end, and thereafter the valve stem with surrounding seal mounted within the body 10, the seal and plate being hermetically sealed to the body by solder as indicated. The upper or operating stem is then threaded into the bonnet, the hand wheel attached and the collar assembled over the upper end of the valve stem with the anti-friction ball received therein. The operating stem is threaded downwardly in the bonnet sufficiently to cause the lower end to clear the interior bore 80 of the reduced portion and permit insertion of the lower end within the upper end of the connecting collar. Thereafter, by threading the bonnet downwardly upon the stem and at the same time on the upper end of the body, the opposing ends of the operating valve stems with the connecting collar thereabout are drawn upwardly within the bore 80, the surrounding walls of which closely receive the connecting collar as indicated in Fig. 1. With this construction, not only is ease of assembly permitted but after assembly the spun collar is closely retained within the bore 80, the walls of which prevent any spreading of the collar or disassembling of the two stems due to transmission of strains therethrough. It will be evident that during the entire range of movement of the valve from open to closed position, the connecting collar and stems closed thereby are confined within the bore 80 of the bonnet. The operating stem is guided within this same bore 80, and limited in its movement of retraction by an annular enlarged portion 90 formed integrally therewith and contacting on the opening movement with a shoulder 92 forming the upper end of the bore, this enlarged portion positively limiting the movement of the stem in this direction and avoiding the transmission of unusual strains to the connecting collar.

I have found it desirable to interpose a relatively soft metal sealing gasket between the shoulder 92 and the annular ring 90 to insure sealing of the operating stem in the event of accidental rupture or breakage of the bellows. As will be evident from Figs. 1 and 2 of the drawing, this sealing gasket closes the space for leakage between the upper face of the annular extension 90 and the shoulder 92 when the valve stem is retracted to full open position, as shown in the drawing. This sealing gasket may be a thin copper washer, as indicated at 94.

What is claimed is:

1. A valve comprising a body portion, a valve stem received therein, a metallic bellows surrounding the valve stem and hermetically sealing the space around the valve stem from the interior of the body portion, a bonnet, an operating stem threaded in the bonnet, and detachable means received within the bonnet for connecting the operating and valve stems together in assembled relation.

2. A valve comprising a body portion, a valve stem received therein, an elongated metallic bellows surrounding the valve stem, an enlargement upon the valve stem to which the lower end of the bellows is secured, a stationary plate connected to the bellows and surrounding the upper end of the valve stem and received within and closing the upper portion of the body, means for hermetically sealing the connected end of the bellows, the plate and the body in assembled relation, and a bonnet connected to the body portion and enclosing the stationary plate and connected end of the bellows.

3. A valve comprising a body portion having a plurality of ports communicating with a fluid chamber therein and a stem chamber communicating with the fluid chamber, the stem movable within the stem chamber and intersecting the fluid chamber, a valve mounted on the end of the stem and closing one of the ports to the fluid chamber, a guide formed upon the stem and operating entirely within the stem chamber to avoid restriction in the fluid chamber, and means for transmitting longitudinal movements to the valve stem.

4. A valve comprising a body portion, a valve stem received therein, a separate operating stem, annular shoulders formed upon adjacent ends of the two stems, a separate detachable connecting collar open at one side for engagement with the shouldered ends of the stems and forming an operative connection therebetween, and a bonnet connected to the body portion in which the operating stem is supported.

5. A valve comprising a body portion, a valve stem received therein, a metallic diaphragm surrounding the stem and sealing the space thereabout from the interior of the body portion, an operating stem, detachable means connecting the two stems, and a bonnet connected to the body portion and receiving the detachable means to prevent disengagement of the two stems when the unit is operatively assembled.

6. A valve comprising a body portion, a valve stem received therein, a metallic diaphragm surrounding the stem and sealing the space thereabout from the interior of the body portion, an operating stem, detachable means connecting the two stems, a bonnet connected to the body portion and receiving the detachable means to prevent disengagement of the two stems when the unit is operatively assembled, and means for limiting movement of withdrawal of the operating stem and sealing the space thereabout.

7. A valve comprising a casing, a valve stem, a bellows surrounding the stem and hermetically sealing the space thereabout, a stem operably mounted in the casing and connected to the valve stem and having an annular extension thereon serving as a stop, a shoulder on the casing cooperating with the stop to limit full open position of the valve, and a sealing member interposed between the stop and shoulder to seal exit from the valve chamber about the stem in the event of leakage through the bellows.

8. A valve comprising a body portion, a two-part valve stem received therein, a swivel connection including a split collar for holding the two parts of the stem in operative relationship, a valve at the inner end of the stem, and a metallic diaphragm surrounding the stem and sealing exit from within the valve body about the valve stem.

WALTER B. CLIFFORD.